(12) United States Patent
McGuire (10) Patent No.: US 7,258,073 B2
(45) Date of Patent: Aug. 21, 2007

(54) PICTORIAL THERMOMETER

(76) Inventor: Katherine M. McGuire, 6115 Brookbank, Downers Grove, IL (US) 60516

(*) Notice: Subject to any disclaimer, the term of this patent is extended or adjusted under 35 U.S.C. 154(b) by 54 days.

(21) Appl. No.: 11/038,481

(22) Filed: Jan. 21, 2005

(65) Prior Publication Data
US 2005/0178314 A1 Aug. 18, 2005

Related U.S. Application Data

(60) Provisional application No. 60/537,394, filed on Jan. 20, 2004.

(51) Int. Cl.
G01K 1/02 (2006.01)
G01K 11/12 (2006.01)
(52) U.S. Cl. ........................ 116/216; D10/57
(58) Field of Classification Search ............... 116/207, 116/216; 347/162, 141; D10/57, 52
See application file for complete search history.

(56) References Cited

U.S. PATENT DOCUMENTS

| 460,923 | A | | 10/1891 | Parker | |
|---|---|---|---|---|---|
| 509,169 | A | * | 11/1893 | Ireland | 73/170.16 |
| 2,141,526 | A | * | 12/1938 | Foster | 434/217 |
| D157,653 | S | | 3/1950 | Barkules et al. | D10/54 |
| D175,064 | S | | 7/1955 | Bradley | |
| 2,854,765 | A | | 10/1958 | Rickless | |
| D184,092 | S | | 12/1958 | Kremer | |
| D187,816 | S | | 5/1960 | Woofter | |
| 3,802,945 | A | * | 4/1974 | James | 428/1.5 |
| 3,861,213 | A | | 1/1975 | Parker | |
| 3,898,354 | A | * | 8/1975 | Parker | 427/256 |
| 3,965,742 | A | * | 6/1976 | Parker | 374/161 |
| 4,019,368 | A | | 4/1977 | Navato | 374/162 |
| 4,149,852 | A | | 4/1979 | Tiru et al. | |
| 4,198,920 | A | | 4/1980 | Russell | |
| 4,246,302 | A | * | 1/1981 | Benton et al. | 428/1.25 |
| 4,345,470 | A | | 8/1982 | Hof et al. | |
| 4,554,565 | A | | 11/1985 | Kito et al. | 503/201 |
| 4,863,282 | A | | 9/1989 | Rickson | 374/162 |
| 5,011,445 | A | | 4/1991 | Nakasuji et al. | |
| 5,058,999 | A | * | 10/1991 | Davis | 349/197 |
| 5,085,607 | A | | 2/1992 | Shibahashi et al. | |
| 5,202,677 | A | * | 4/1993 | Parker et al. | 349/21 |
| 5,208,132 | A | | 5/1993 | Kamada et al. | |
| 5,219,625 | A | | 6/1993 | Matsunami et al. | |
| D346,120 | S | | 4/1994 | Yoshikawa | |
| 5,375,271 | A | | 12/1994 | Frankel | |
| 5,484,205 | A | | 1/1996 | Grupp et al. | 374/142 |
| 5,503,583 | A | | 4/1996 | Hippely et al. | |
| 5,558,700 | A | | 9/1996 | Shibahashi et al. | |

(Continued)

FOREIGN PATENT DOCUMENTS

EP 330171 A1 * 8/1989

(Continued)

Primary Examiner—R. Alexander Smith
(74) Attorney, Agent, or Firm—Shlesinger, Arkwright & Garvey LLP (57) ABSTRACT

A thermometer comprising a base sheet adapted to be secured to a window or other surface, the sheet includes distinct thermally actuated latent images thereon and each of which is adapted to reversibly depict a different article of clothing once a pre-determined temperature or temperature range is measured whereby a viewer is informed of the appropriate clothing items for the measured temperature conditions.

18 Claims, 6 Drawing Sheets

U.S. PATENT DOCUMENTS

| | | | |
|---|---|---|---|
| 5,716,253 A | 2/1998 | Aoki et al. | |
| 5,809,590 A * | 9/1998 | Williams et al. | 4/661 |
| D399,436 S | 10/1998 | Schwarz | |
| 5,858,914 A | 1/1999 | Shibahashi et al. | |
| 5,928,803 A | 7/1999 | Yasuda | |
| 6,053,633 A | 4/2000 | Bilenker | |
| 6,241,386 B1 | 6/2001 | Limburg et al. | 374/162 |
| D469,701 S * | 2/2003 | Safronchik et al. | D10/58 |
| D477,237 S | 7/2003 | Heath | |
| 6,585,555 B2 | 7/2003 | Wong et al. | |
| 6,604,854 B1 | 8/2003 | Limburg et al. | 374/162 |
| 6,694,912 B2 | 2/2004 | Wesley | |
| 6,889,388 B1 * | 5/2005 | Barlia | 2/82 |
| 2004/0004069 A1 | 1/2004 | Lerner | |
| 2005/0178314 A1 * | 8/2005 | McGuire | 116/216 |
| 2006/0002450 A1 * | 1/2006 | Padgett | 374/208 |

FOREIGN PATENT DOCUMENTS

| | | | |
|---|---|---|---|
| GB | 2199981 A * | 7/1988 | |
| GB | 2420852 A * | 6/2006 | |
| JP | 61281215 A * | 12/1986 | |
| JP | 2005349120 A * | 12/2005 | |
| NL | 1012355 C * | 7/1999 | |

* cited by examiner

PICTORIAL THERMOMETER

CROSS-REFERENCE TO RELATED APPLICATION

This application is a non-provisional application claiming the benefit of U.S. provisional application Ser. No. 60/537,394 filed on Jan. 20, 2004.

FIELD OF THE INVENTION

The present invention relates to thermometers and in particular, a thermometer adapted to visually indicate to the user the appropriate clothing for the temperature measured.

BACKGROUND OF THE INVENTION

Changes in seasonal temperatures necessitate the need to dress in clothing that is appropriate for the outdoor temperature. Parents will teach their children how to dress for the current weather conditions and encourage them to accomplish these tasks on their own.

However, such instruction often requires patience and perseverance on the part of the parent because children are highly individual in their capacity to learn. It is often difficult for a young child to correlate the numerous individual items of clothing such as sweaters, hats, gloves and earmuffs, with a temperature range that is appropriate. Further, very young children lack the cognitive ability to fully understand the temperature readings provided by a conventional outdoor thermometer. As is apparent, understanding outdoor temperatures is essential for dressing properly. In the case of a child having a learning disability, these problems are compounded.

The above is not limited to children since an adult suffering from Alzheimer's disease or dementia will likewise encounter problems when attempting to dress for outdoor activities. As is apparent, failure to correctly dress may result in injury or even death during severely cold conditions.

A need has therefore existed for a thermometer that is adapted to convey easily understood information to children or adults as to the appropriate type of dress for venturing outdoors.

DETAILED DESCRIPTION OF THE PREFERRED EMBODIMENTS

Figures 1, 2:
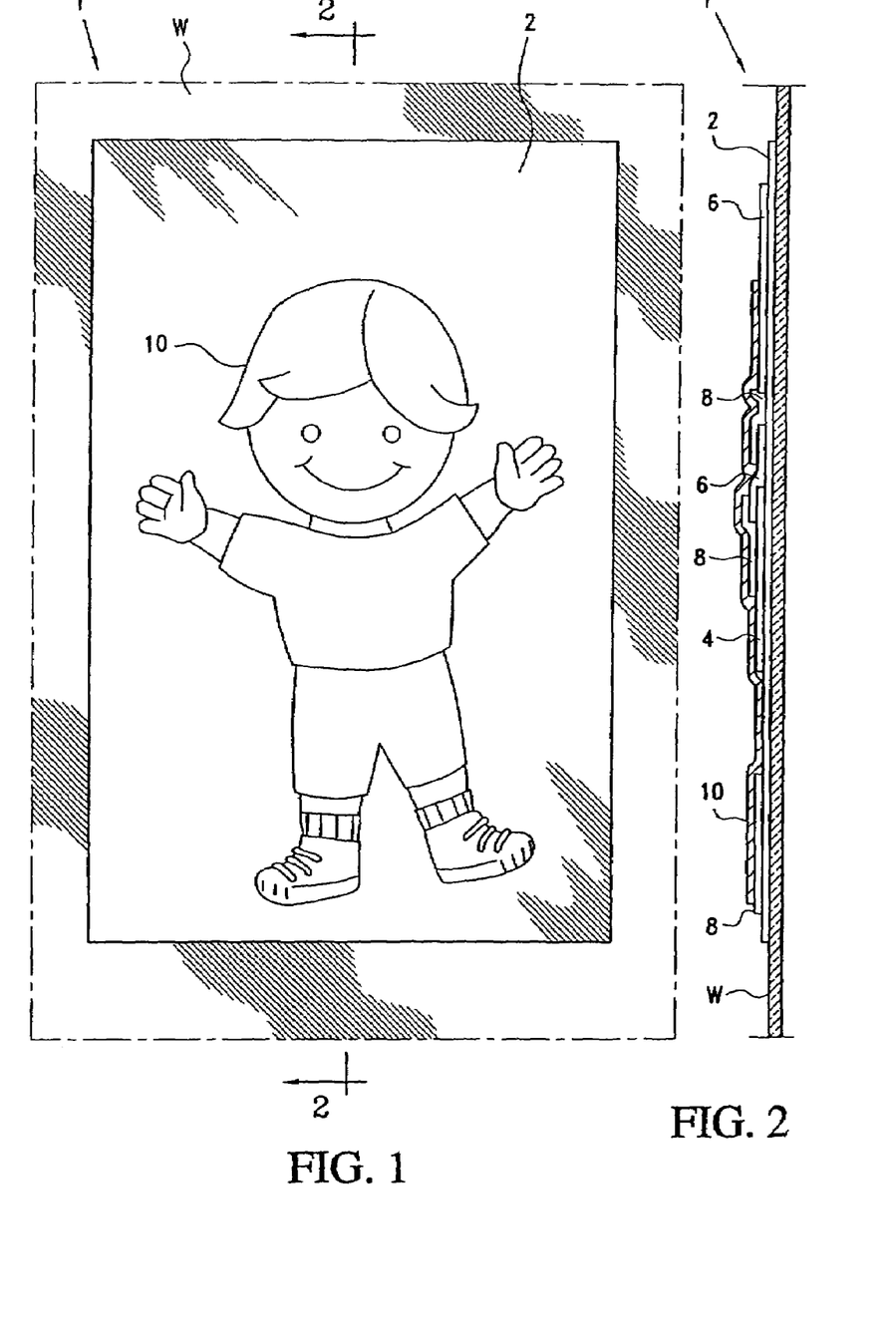
FIG. 1 is a top plan view of the present invention when secured to a glass windowpane and with none of the thermochromic layers activated by a temperature change.
FIG. 2 is a sectional view of FIG. 1 taken along lines 2-2.

The present invention is shown in each of the figures, FIG. 1 illustrating a first embodiment of the thermometer T secured to a glass window W and corresponding FIG. 2 illustrating the layers comprising thermometer T. The thermometer T may be secured to either the interior or the exterior of the window W.

Thermometer T includes a base sheet or substrate 2 that is preferably a transparent polyvinyl film or similar polymer based material having a semi tack adhesive applied to one side (not shown) or otherwise provided with static cling properties so that it is adapted to be secured to a glass window as shown in the figures or any other desired surface. The base sheet 2 may be constructed from weather resistant materials so that it is adapted to withstand seasonal temperature changes, precipitation and exposure to UV rays. If constructed from a polyvinyl film material, the base sheet 2 is preferably about 4 mils in thickness but may be as thin as 1 mil depending upon the nature of the sheet material selected or even have a thickness greater than 10 mils. Although a transparent sheet is preferred, a non-transparent sheet or opaque sheet is within the scope of the invention provided it is adapted to receive printing on the surface of the sheet.

The top surface of base sheet 2 is printed or coated with one or more thermally actuated materials. A thermally actuated material according to the present invention is an ink, coating or even a sheet containing thermochromic liquid crystals however thermally actuated materials other than thermochromic liquid crystals are within the scope of the present invention. Thermochromic liquid crystals react to changes in temperature by changing color or becoming visible once the material is exposed to a selected threshold temperature or temperature range, for example a decreasing temperature. The color change or visibility of the thermochromic liquid crystal is reversible when the temperature increases above the threshold temperature or temperature range. It is within the scope of the invention to use materials other than thermochromic liquid crystals so long as they provide similar temperature sensitive properties. Thermochromic liquid crystals exhibit color by selectively reflecting incident white light. Temperature sensitive thin films reflect bright colors with decreasing temperatures, turning from colorless through the various colors in the visible spectrum in sequence (red, yellow, green, blue, violet) before returning to the colorless state at higher temperatures.

Thermochromic liquid crystals may be produced as temperature sensitive inks optimized for application into print using screen printing techniques, flexography or offset printing. The ink may be UV curable to speed drying time or solvent based or even water soluble however the latter form often requires a protective overcoat layer applied onto the ink. Thermochromic inks according to the present invention are those which render good appearance and clear-bright color change properties, are invisible prior to temperature activation and are reversible after a change in the activation temperature. Over-printing two or more different thermochromic inks to produce multicolored indicia is within the scope of the present invention. Representative thermochromic inks for use within the present invention are manufactured by CTI Chromatic Technologies, Inc. of Colorado Springs, Colo. Although the working temperatures of thermochromic liquid crystal materials is quite broad (−220 degrees Fahrenheit to 239 degrees Fahrenheit), a preferred embodiment of the present invention will employ thermochromic inks that produce visible color at temperatures below about 70 degrees Fahrenheit and as low as about 28 degrees Fahrenheit. As is apparent, other temperature ranges are within the scope of the present invention depending upon how the pictorial thermometer is used. For example, an indoor version of the pictorial thermometer may use thermochromic liquid crystals that are adapted to become visible upon temperatures below 78 degrees Fahrenheit through about 68 degrees Fahrenheit.

Figure 3:
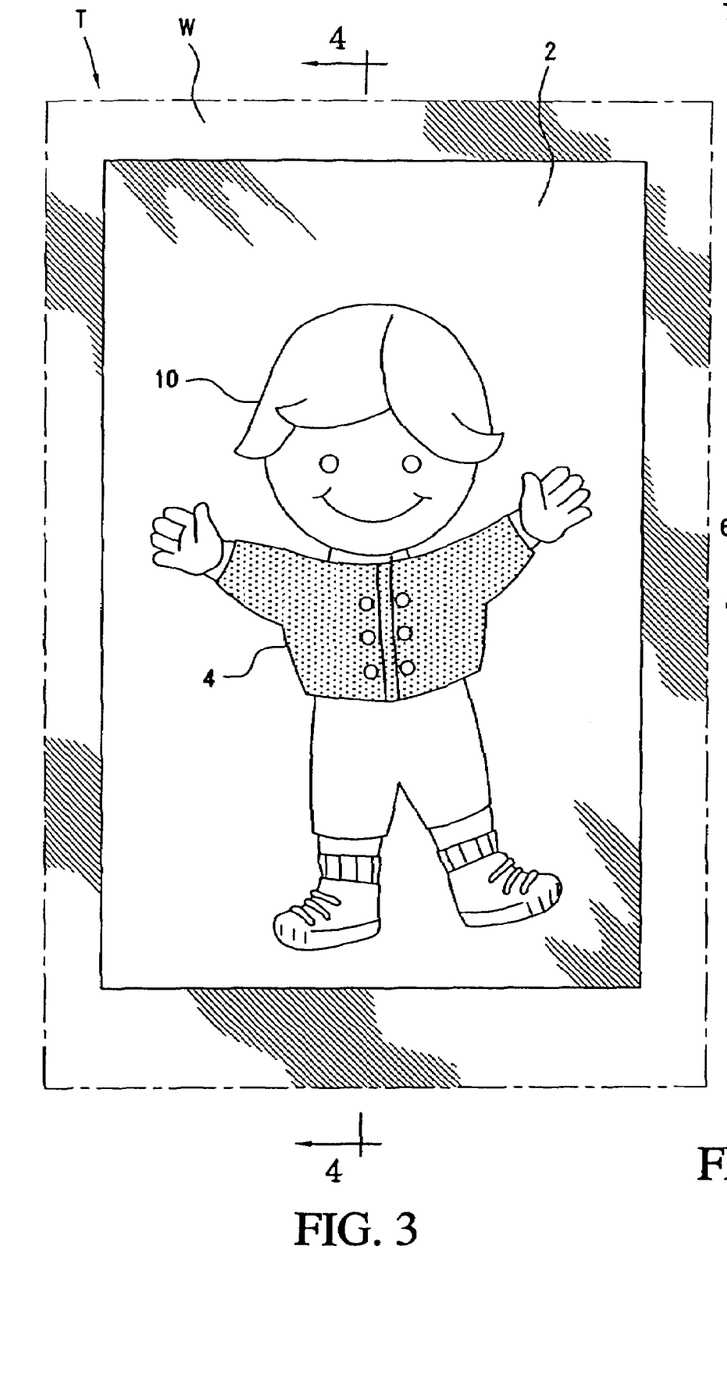
FIG. 3 is a top plan view of the device shown in FIG. 1 showing a first thermochromic layer activated by a first temperature change.
Figure 4:
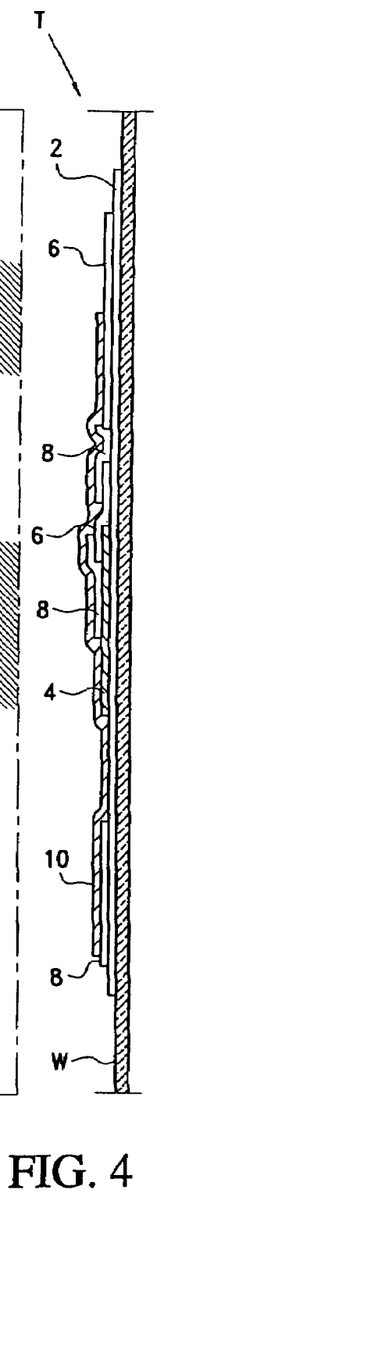
FIG. 4 is a sectional view of FIG. 1 taken along lines 3-3.

The temperature sensitive thermochromic ink or coating as set forth above is applied to the base sheet 2 via any of the printing methods noted above to create a latent image that, upon actuation and becoming visible, is readily recognized by the child as a particular item of clothing. Turning to FIG. 2, a thermally actuated latent image layer 4 of thermochromic ink adapted to actuate and start to become visible as a jacket at temperatures below about 54 degrees and fully viable at temperatures below about 47 degrees Fahrenheit is provided on base sheet 2. The jacket depicted in layer 4 is not shown in FIG. 1 or 2 to be in the thermally actuated and visible state. The thermally actuated and visible state for layer 4 depicting a jacket is shown in FIGS. 3 and 4 and will be discussed in greater detail below.

Figure 5:
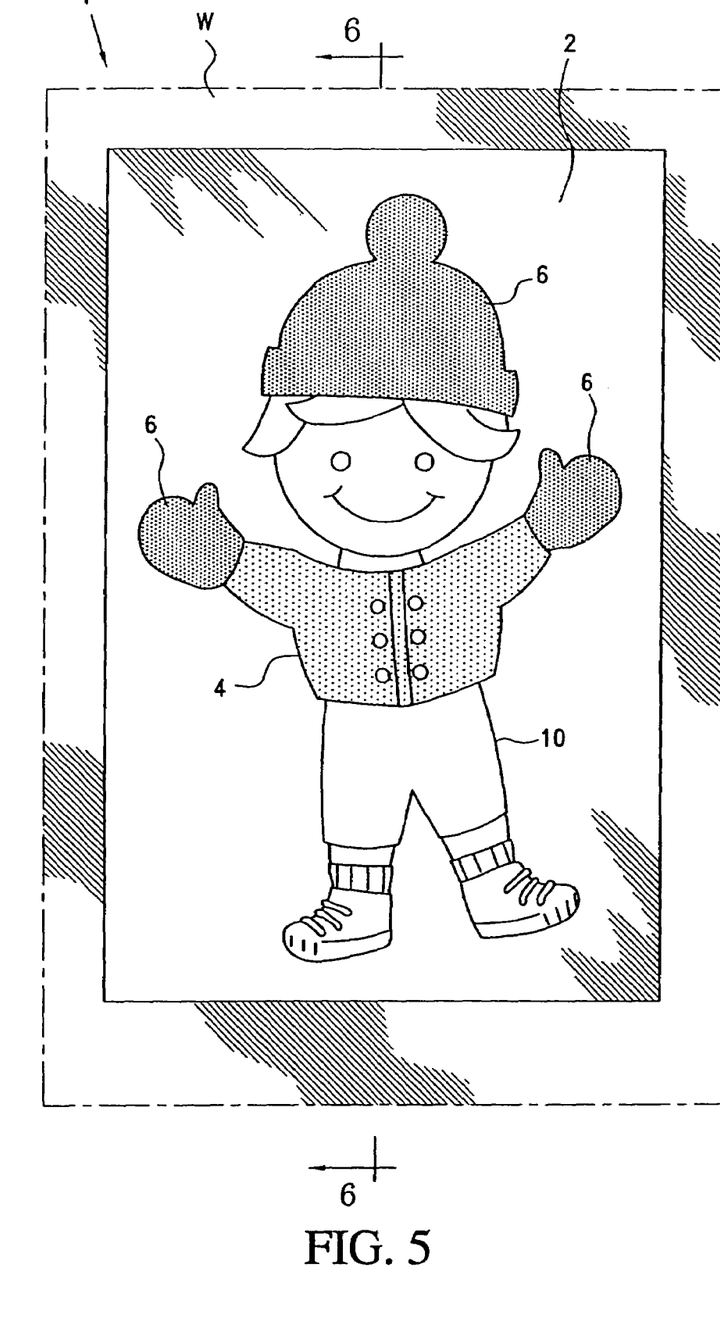
FIG. 5 is a top plan view of the device shown in FIG. 3 with a second thermochromic layer activated after a second temperature change.
Figure 6:
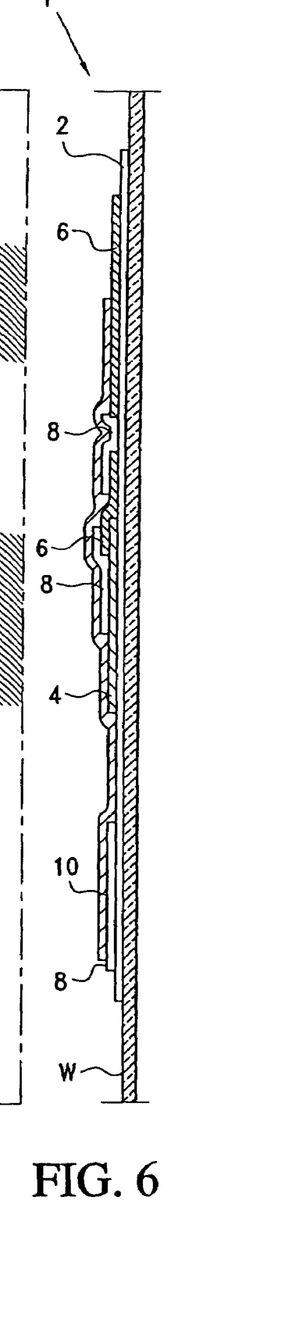
FIG. 6 is a sectional view of FIG. 5 taken along lines 6-6.

After layer 4 is cured or dried, a second thermally actuated latent image layer 6 of thermochromic ink is applied onto the base sheet 2 via printing or coating. The layer 6 is shown in the drawings as being applied on the base sheet 2 in three separate regions and in the form of indicia depicting a pair of gloves and a hat. As shown in FIG. 5, thermally actuated latent image layer 6 is formed from thermochromic ink adapted to actuate and start to become visible as a pair of gloves and hat at temperatures below about 44 degrees and fully viable at temperatures below about 37 degrees Fahrenheit is provided on base sheet 2. The pair of gloves and hat formed by layer 6 is not shown thermally actuated and visible state in FIGS. 1 and 3. The thermally actuated and visible state for layer 6 (as well as layer 4) depicting a pair of gloves and hat is shown in FIGS. 5 and 6.

Figures 7, 8:
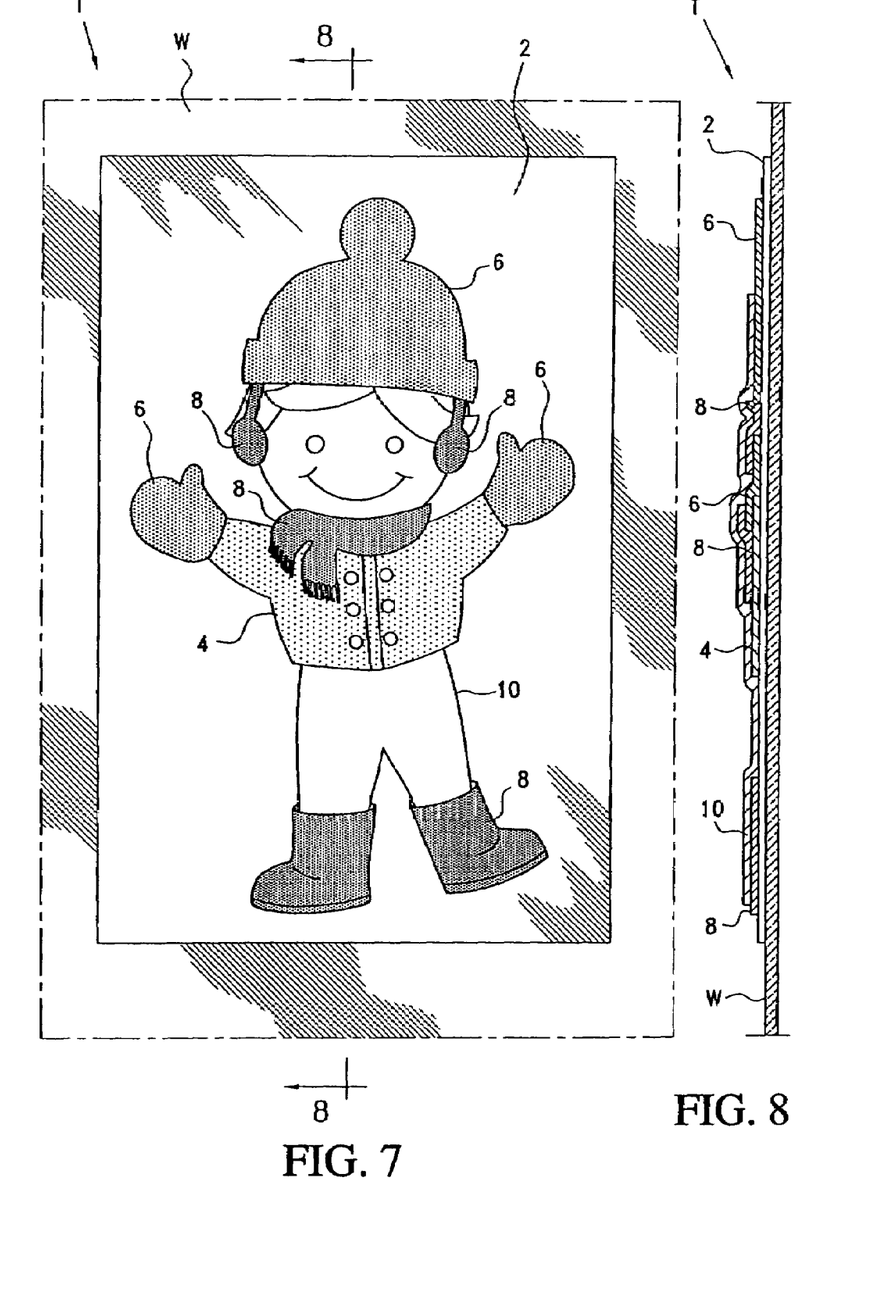
FIG. 7 is a top plan view of the device shown in FIG. 5 with a third thermochromic layer activated after a third temperature change.
FIG. 8 is a sectional view of FIG. 7 taken along lines 8-8.

After layer 6 has cured or dried, a third thermally actuated latent image layer 8 of thermochromic ink is applied onto the base sheet 2 via printing or coating in the above noted manner and as shown in FIGS. 2, 4, 6 and 8. The layer 8 overlies the base sheet 2 in five separate regions (FIG. 7) and in the form of indicia depicting a pair of boots, a scarf and earmuffs. The thermally actuated latent image layer 8 of thermochromic ink is adapted to actuate and start to become visible as a pair of boots, scarf and earmuffs at temperatures below about 35 degrees and become fully viable at temperatures below about 28 degrees Fahrenheit. The pair of boots, scarf and earmuffs formed by layer 8 is not shown thermally actuated and in a visible state in FIGS. 1 through 6 but is shown in FIGS. 7 and 8 when in the thermally actuated and visible state (along with visible layers 4, 6 and 8) so that a pair of boots, a scarf and earmuffs is visible.

Overlying each of the above described layers and base sheet is a coating of conventional ink 10 that is not thermally actuated nor otherwise affected by temperature changes. As best shown in FIG. 1, this coating of conventional ink depicts a child however other forms of indicia may be depicted within the scope of the present invention. As is apparent from FIGS. 3, 5 and 7, the child shown in FIG. 1 is sized so that each of the items of clothing depicted in actuated layers 4, 6 and 8 are such that the child appears to be wearing the various clothing items.

The thermochromic inks forming each of layers 4, 6 and 8 are such that the indicia formed by the conventional ink 10 is sequentially obscured by the overlying layers as each latent image becomes increasingly visible due to progressive drop in the environmental temperature so that the child depicted on the thermometer T appears to be wearing various items of clothing corresponding to the present air temperature. As is apparent, an increase in air temperature result in the visible images becoming increasingly transparent and invisible so that the child is shown to only be wearing clothing appropriate for the current temperature increase.

The coating or print of conventional ink 10 applied onto the top of the thermometer may be combined with a transparent protective cover sheet that overlies the entire thermometer to prevent the various layers from exposure to outdoor elements or to otherwise prevent damage to the various layers. This sheet may be formed for example from a scratch and UV resistant epoxy polymer coating several mils thick or a polyvinyl chloride sheet laminated to the face of the thermometer or even a metallic film. Other materials capable of forming a protective layer to protect all the underlying coatings are within the scope of the present invention so long as they do not inhibit or otherwise interfere with the operation of the thermometer.

In view of the above, it can be seen the thermometer of the present invention will provide information to a child or other individual in a pictorial manner and easily enable him or her to understand the proper dress required before venturing outdoors. Because the various thermochromic layers are reversible, the device is well adapted to continually convey this information regardless of temperature fluctuations. Of course, the images may be rendered to be non-reversible if desired. In that case, the thermometer would be adapted for one time use and would provide a fixed record of the clothing recommended. Obviously, it is within the scope of the invention to provide further layers other than those described herein. For example, additional layers of thermochromic ink could be added which are responsive to even more extreme temperature drops where, for example, a face muffler or snow pants would be depicted. In addition, the temperature ranges recited for the various thermochromic layers describe herein may be modified depending upon use of the device.

Figures 9, 10:
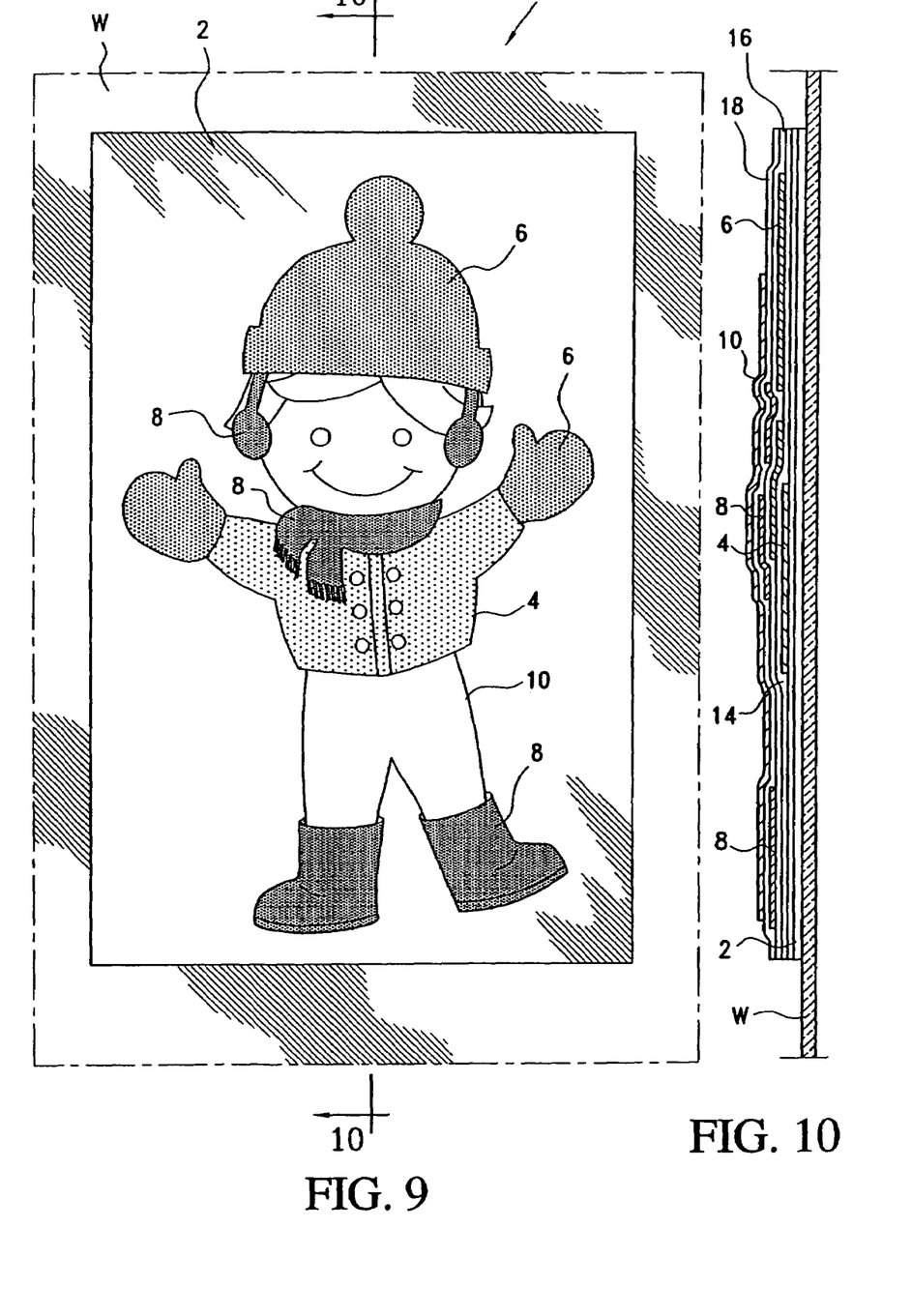
FIG. 9 is a top plan view of an alternative embodiment of the present invention and shows the device with three thermochromic layers being activated by a temperature change.
FIG. 10 is a sectional view of FIG. 9 taken along lines 10-10.

An alternative embodiment of the present invention is shown in FIGS. 9 and 10 wherein each of the various layers shown in FIGS. 1 though 8 are provided in laminate form. That is, each of layers 4, 6 and 8 are applied to separate sheets of polyvinyl chloride or other sheet material and then individual sheets are bonded or otherwise laminated together into a single sheet. FIG. 10 shows laminate sheets 14, 16 and 18 on which layers 4, 6 and 8 are respectively applied. The laminate sheets are then bonded to the underlying base sheet 2. As is apparent, the individual laminate sheets are formed from a material and have a thickness which will not impede operation of the various thermochromic layers.

The present invention may be adapted so that the sheet top or uppermost sheet forming the thermometer is directly secured to the window rather than the underside of the base sheet being secured to the window. In this embodiment, the protective sheet or coating will have an adhesive applied on the top surface of the sheet or be constructed from a material that has static cling characteristics on its exterior surface.

Figure 11:
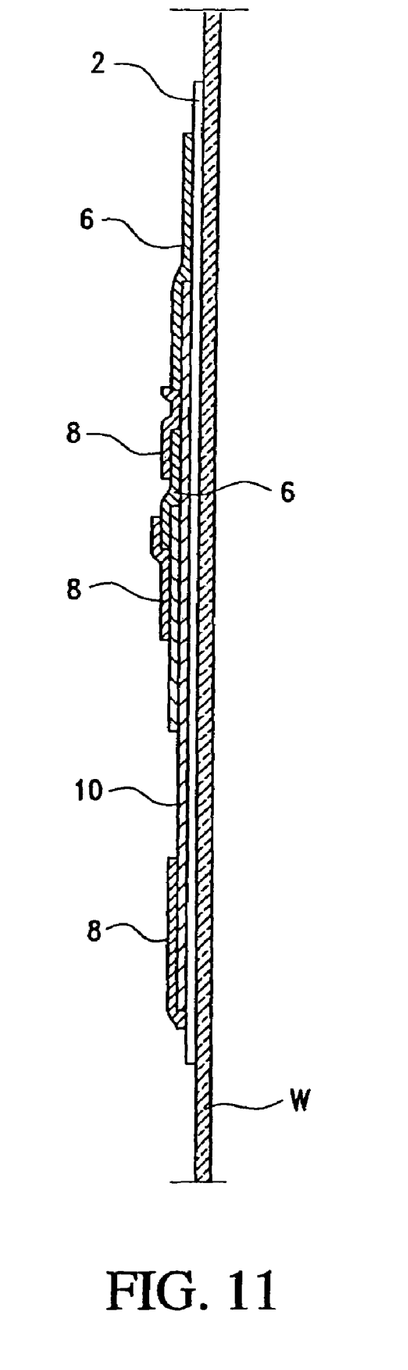
FIG. 11 is a sectional view of an alternative embodiment of the present invention.

FIG. 11 illustrates a still further embodiment where the coating or print of conventional ink 4 is the initial layer applied to the base sheet 2 rather than being formed as the topmost layer as set forth above, but without a protective coating or sheet as the uppermost layer. The protective coating or sheet may of course be applied if so desired.

Figure 12:
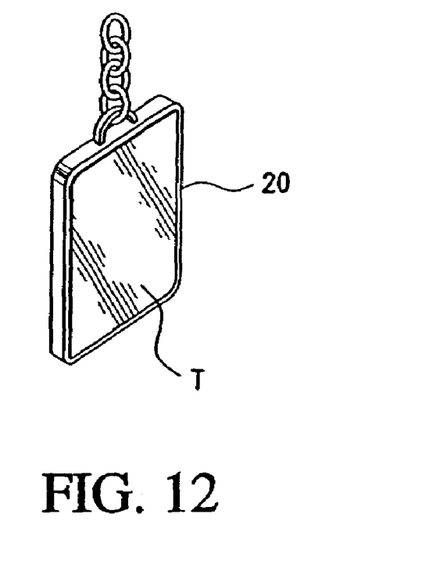
FIG. 12 is a perspective view showing the device according to the present invention in combination with a key chain.

FIG. 12 illustrates an embodiment where the thermometer T as set forth above is combined within the casing of a key chain or zipper pull tab 20 for attachment to a zipper of a book bag or backpack (not shown). It is within the scope of the present invention to adapt the thermometer of the present invention to various other such devices used outdoors since the pictorial temperature would provide to such devices the numerous advantages set forth herein.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

I claim:

1. A thermometer comprising:
   a) a base sheet having a top surface and a back surface;
   b) a first image generating element provided on said base sheet top surface within a first defined region thereon, said first image generating element having a first latent image phase operable at a first temperature and a first visible image phase operable at a second temperature, said second temperature is below said first temperature and whereby subjecting said first image generating element when in said first visible image phase to said first temperature will re-generate said first latent image phase;
   c) at least a second image generating element provided on said base sheet top surface and within a second defined region thereon, said at least second image generating element having a second latent image phase operable at a third temperature and a second visible image phase operable at a fourth temperature, said fourth temperature is below said third temperature whereby subjecting said at least second image generating element when in said second visible phase to said third temperature will re-generate said second latent image phase;
   d) said fourth temperature is lower than said second temperature; and
   e) said first and second visible image phases depicting items of clothing appropriate for said second and fourth temperatures whereby decreasing atmospheric temperatures will cause an increase in the number of said items of clothing to be visible on said base sheet.

2. A thermometer as in claim 1 and wherein said second and fourth temperatures define a temperature range.

3. A thermometer as in claim 1 and wherein said second visible image phase has a greater density than said first visible image phase.

4. A thermometer as in claim 1 and further comprising:
   a) additional image generating elements provided on said base sheet top surface and each of which having a latent image phase operable at another first temperature and a visible image phase operable at another second temperature, each of said visible image phases of said additional image generating elements is activated at a progressively lower temperature.

5. A thermometer as in claim 1 and further comprising:
   a) a protective laminate provided on said base sheet top surface and overlying at least said first image generating element and said second image generating element.

6. A thermometer as in claim 1 and further comprising:
   a) fixed indicia adapted to be at least partially obscured by each of said visible image phases.

7. A thermometer as in claim 6 and wherein said fixed indicia is at least one of directly applied to said base sheet top surface or on top of said first and second image generating elements or is combined with a sheet material that is applied to a base sheet that is secured to said thermometer.

8. A thermometer as in claim 1 and wherein said first and second image generating elements comprise thermochromic inks printed in the form of said items of clothing.

9. A thermometer as in claim 1 and wherein said base sheet is formed from a static cling material adapted to attach said thermometer to a surface.

10. A thermometer as in claim 1 and further including:
    a) an adhesive layer adapted to secure said thermometer to a surface.

11. A thermometer as in claim 1 and wherein each of said first and second image generating elements is separated from each other by respective laminate sheets.

12. A thermometer as in claim 1 and wherein each of said first and second visible image phases provides a distinct color image.

13. A thermometer as in claim 1 and further including a zipper pull tab, said base sheet is encased within said zipper pull tab.

14. A thermometer comprising:
    a) a base sheet;
    b) fixed indicia provided on said base sheet, said fixed indicia depicting a person;
    c) a first image generating element provided on said base and at least partially superimposed on said fixed indicia, said first image generating element having a first latent image phase operable at a first temperature and a first visible image phase operable at a second temperature, said first visible image depicting a first item of clothing, said second temperature is below said first temperature; and
    d) at least a second image generating element provided on said base sheet and at least partially superimposed on said fixed indicia, said at least second image generating element having a second latent image phase operable at a third temperature and a second visible image phase operable at a fourth temperature, said second visible image depicting a second item of clothing, said fourth temperature is below said third temperature whereby progressively decreasing atmospheric temperatures will cause an increase in the number of items of clothing to be visible on said base sheet and in a manner that progressively obscures said fixed indicia from view.

15. A thermometer as in claim 14 and wherein said second and fourth temperatures define a temperature range.

16. A thermometer as in claim 14 and wherein said first and second visible image phases have a density greater than said fixed image.

17. A thermometer as in claim 14 and wherein said items of clothing are appropriate for wear at said second and fourth temperatures.

18. A thermometer comprising:
    a) a base sheet having a top surface and a back surface;
    b) a first image generating element provided on said base sheet top surface within a first defined region thereon, said first image generating element having a first latent image phase operable at a first temperature and a first visible image phase operable at a second temperature, said second temperature is below said first temperature and whereby subjecting said first image generating element when in first visible image phase to said first temperature will re-generate said first latent image phase;

c) at least a second image generating element provided on said base sheet top surface and within a second defined region thereon, said at least second image generating element having a second latent image phase operable at a third temperature and a second color visible image phase operable at a fourth temperature, said fourth temperature is below said third temperature whereby subjecting said at least second image generating element when in said second visible phase to said third temperature will re-generate generate said second latent image phase;

d) said fourth temperature is lower than said second temperature whereby decreasing atmospheric temperatures will cause a corresponding increase in the number of visible images generated on said base sheet; and e) said first and second visible image phases of each of said first and said second image generating elements depicting types of clothing appropriate for said second and fourth temperatures.

\* \* \* \* \*